(12) United States Patent
Laksono et al.

(10) Patent No.: US 6,288,729 B1
(45) Date of Patent: Sep. 11, 2001

(54) METHOD AND APPARATUS FOR A GRAPHICS CONTROLLER TO EXTEND GRAPHICS MEMORY

(75) Inventors: Indra Laksono, Richmond Hill; Gordon Caruk, Bramalea, both of (CA)

(73) Assignee: ATI International SRL, Barbados (KN)

(*) Notice: Subject to any disclaimer, the term of this patent is extended or adjusted under 35 U.S.C. 154(b) by 0 days.

(21) Appl. No.: 09/259,373

(22) Filed: Feb. 26, 1999

(51) Int. Cl.$^7$ .................................................. G06F 13/14
(52) U.S. Cl. ............................................. 345/520; 345/531
(58) Field of Search .................................. 345/520, 564, 345/531, 532, 501, 502, 503, 541, 542, 545, 565; 710/126–129

(56) References Cited

U.S. PATENT DOCUMENTS 5,559,952 * 9/1996 Fujimoto ............................. 395/511
6,072,506 * 6/2000 Schneider ............................ 345/509
6,104,417 * 8/2000 Nielsen et al. ...................... 345/521
6,128,026 * 10/2000 Brothers, III ....................... 345/508

* cited by examiner

Primary Examiner—Kee M. Tung
(74) Attorney, Agent, or Firm—Vedder, Price, Kaufman & Kammholz

(57) ABSTRACT

A method and apparatus include processing which allows a graphics controller to extend its memory by receiving a client address and determining which of a plurality of system bus interfaces (e.g., AGP, PCI, ISA) is enabled. When a first type of system bus interface is enabled (e.g., PCI, ISA), a first system bus table index is generated based on the client address. The first system bus table index is used to access a first system bus table to retrieve a physical address of memory. The processing continues by obtaining data from the memory, wherein the data is stored at the physical address.

22 Claims, 3 Drawing Sheets

_US 6,288,729 B1_

METHOD AND APPARATUS FOR A GRAPHICS CONTROLLER TO EXTEND GRAPHICS MEMORY

TECHNICAL FIELD OF THE INVENTION

This invention relates generally to video graphics processing and more particularly to extending useable memory, including video graphics memory.

BACKGROUND OF THE INVENTION

Computers are known to include a central processing unit (CPU), system memory, video graphics processing circuitry, and peripheral ports, which allow the CPU to communicate with peripheral devices such as monitors, external memory, printers, the Internet, servers, etc. As is also known, the video graphics processing circuitry receives graphics data (e.g., word processing applications, drawing applications, etc.) from the CPU and/or video data (e.g., movies, television broadcasts, etc.) from a video source and processes such input data to produce pixel data. The video graphics processing circuitry stores the pixel data in a frame buffer, where memory locations of the frame buffer correspond to physical locations of a monitor. The correlation of the memory locations to physical pixel locations may be done linearly or in a tiled fashion.

Typically, the frame buffer is contained in video graphics memory associated with the video graphics processing circuitry. If the video graphics processing circuitry needs additional memory (e.g., for storing texture maps, additional video data, additional graphics data, etc.), the CPU assigns a portion of the system memory to the video graphics processing circuitry. Once the memory is assigned, the video graphics processing circuitry may access the memory via an AGP bus and a system memory controller. As such, the CPU is not involved in the video graphics processing circuitry's storage and retrieval of data from the system memory.

As the demand for complex video graphics processing increases, the video graphics processing circuitry requires additional memory. The video graphics processing circuitry may access additional system memory directly or with the assistance of the CPU. To directly access the system memory, the video graphics circuitry needs to maintain the physical addresses of assigned memory blocks of the system memory and their logical memory function (e.g., frame buffer, texture map, video data, etc.). As such, the video graphics processing circuitry would need to maintain two addressing schemes, one for memory that is accessible via the AGP bus or is contained in the video graphics memory and another for the additional memory. As is known, when the video graphics processing circuitry is addressing the system memory using an AGP address, the AGP address is an index based on a logical address (i.e., sequential addresses for memory that is assumed to be contiguous). The AGP index is provided to the system memory controller, which processes the index to obtain the corresponding physical address of the system memory. As is known, the corresponding physical address is obtained using a table look-up, such as GART. As such, with respect to the video graphics processing circuitry the index, and generation thereof, is much less complex than the physical address of the memory and generation thereof When the CPU assists the video graphics processing circuitry in accessing the additional memory, the video graphics processing circuitry provides the index to the CPU. In response, the CPU generates the physical address, which it provides the system memory controller. While this allows the video graphics processing circuitry to only maintain a single addressing scheme, it forces the CPU to be involved, thus reducing the availability of the CPU for other tasks.

Therefore, a need exists for a method and apparatus that allows video graphics processing circuitry to extend its useable graphics memory without having to maintain multiple addressing schemes and with minimal intervention from the CPU.

DETAILED DESCRIPTION OF A PREFERRED EMBODIMENT

Generally, the present invention provides a method and apparatus that includes processing which allows a graphics controller to extend its memory. Such processing begins by receiving a client address and determining which of a plurality of system bus interfaces (e.g., AGP, PCI, ISA) is enabled. When a first type of system bus interface is enabled (e.g., PCI, ISA), a first system bus table index is generated based on the client address. The first system bus table index is used to access a first system bus table to retrieve a physical address of memory. The processing continues by obtaining data from the memory, wherein the data is stored at the physical address. With such a method and apparatus, a graphics controller may directly access the system memory through the PCI bus and/or the ISA bus with minimal intervention from the central processing unit.

Figure 1:
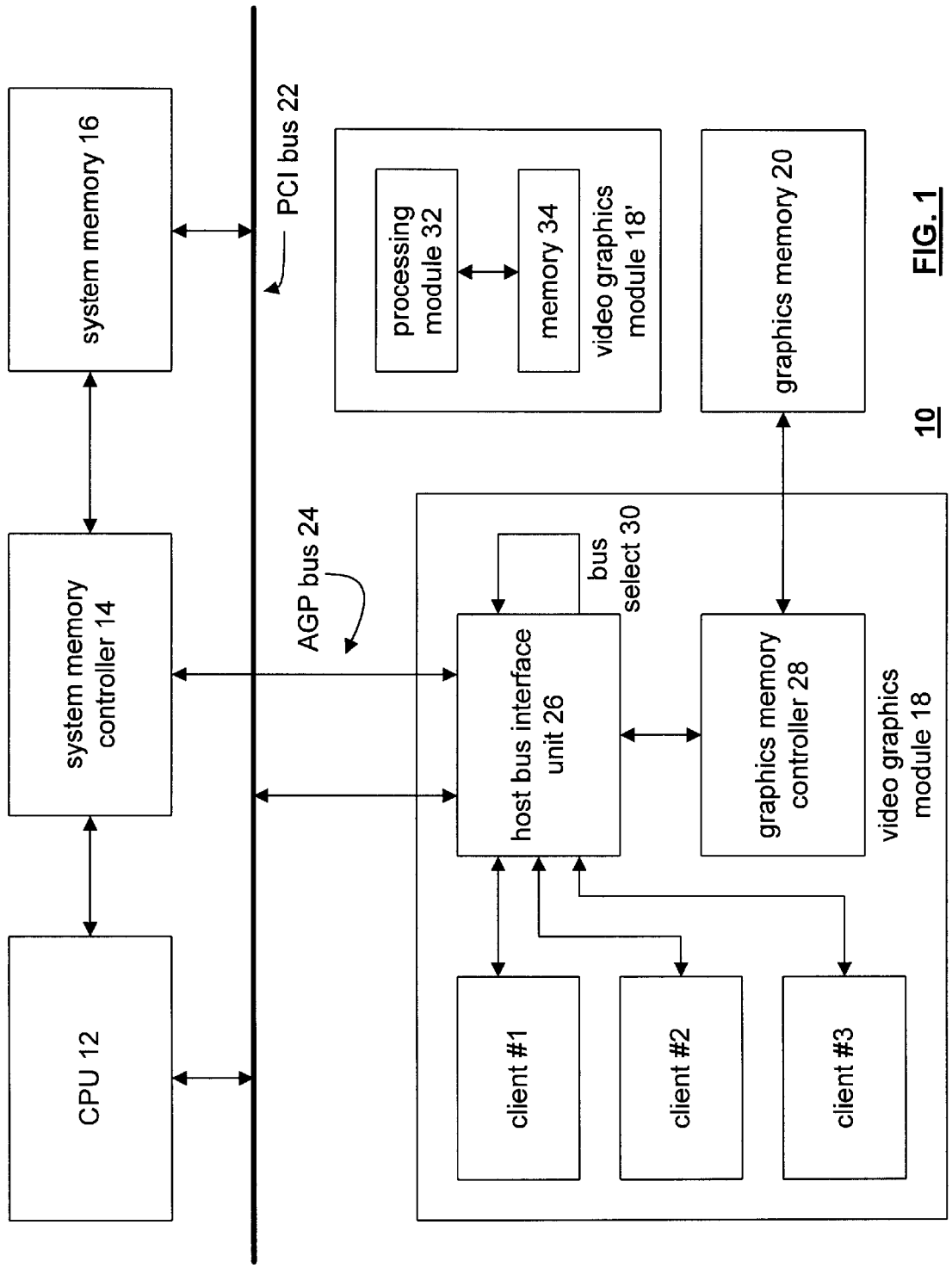
FIG. 1 illustrates a schematic block diagram of a computing system in accordance with the present invention.

The present invention can be more fully described with reference to FIGS. 1 through 3. FIG. 1 illustrates a schematic block diagram of a computing system 10 that includes a central processing unit (CPU) 12, system memory controller 14, system memory 16, a video graphics module 18, and graphics memory 20. The central processing unit 12 is operably coupled to the system memory 16 and the video graphics module 18 via the PCI bus 22. In addition, the central processing unit is coupled to the system memory 16 via the system memory controller 14. The video graphics module 18 is operably coupled to the system memory controller 14 via an AGP bus 24. The central processing unit 12, the system memory controller 14, and the system memory 16 may be of the type found in a personal computer, laptop computer, hand-held computer, work station, and/or any other computing type device.

In accordance with typical computer system operation, the central processing unit 12 controls allocation of system memory 16. For example, the central processing unit 12 may allocate system memory to operating system functionality, the video graphics module 18, etc. When the video graphics module 18 has been allocated a portion of system memory 16, the video graphics module 18 accesses the system memory 16 via the AGP bus 24 and the system memory controller 14. Typically, the allocation of system memory 16 to the video graphics module 18 is performed at system setup. As such, when the video graphics module 18 requires additional allocation of system memory, prior art techniques required the central processing unit 12 to become involved in the allocation of the system memory. In addition, the CPU 12 was involved in accessing the system memory or the video graphics module 18 was required to maintain multiple addressing schemes (e.g., maintaining the physical addresses of the system memory, maintaining AGP addresses, etc.).

The video graphics module 18 overcomes the need for the central processing unit's 12 involvement in system memory access for additional memory and overcomes the need for maintaining multiple addressing schemes. Accordingly, in one embodiment, the video graphics module 18 includes a host bus interface unit 26 and a graphics memory controller 28. The host bus interface unit 26 is operably coupled to the AGP bus 24, the PCI bus 22, a plurality of clients, and the graphics memory controller 28. The host bus interface unit 26 is also operably coupled to receive a bus select signal 30. The clients may be one or more video capture modules, a two-dimensional graphics engine, a three-dimensional graphics engine, a command parsing module, and/or any other video graphics co-processing module. A more detailed operation of the video graphics module 18 with respect to extending the graphics controllers memory will be discussed in greater detail with reference to FIG. 2.

As an alternative embodiment of the video graphics module 18 includes a processing module 32 and memory 34. In such an embodiment, the processing module 32 may be a single processing entity or a plurality of processing entities. Such a processing entity may be a microprocessor, microcomputer, a portion of the central processing unit, digital signal processor, microcontroller, state machine, logic circuitry and/or any device that manipulates signals based on operational instructions. The memory 34 may be a single memory device or a plurality of memory devices. Such a memory device may be read-only memory, random access memory, floppy disk memory, system memory, hard drive memory, magnetic tape memory, CD ROM, and/or any device that stores digital information. Note that when the processing module implements one or more of its functions utilizing a state machine or a logic circuitry, the memory containing the corresponding operational instructions is embedded within the circuitry comprising the state machine or logic circuitry.

Figure 2:
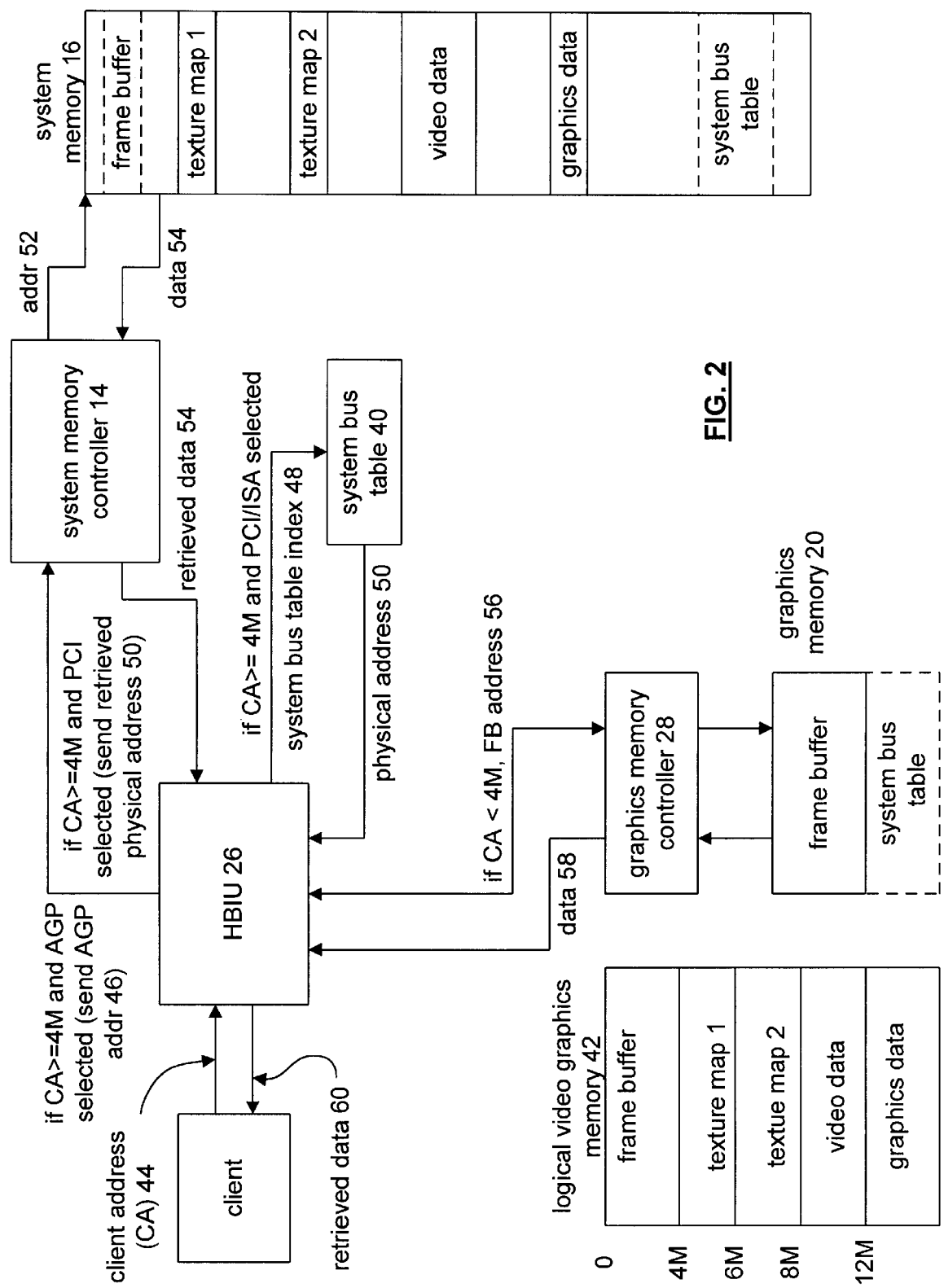
FIG. 2 illustrates a schematic block diagram of a video graphics module in accordance with the present invention.

FIG. 2 illustrates a graphical representation of extending graphics memory for use by the video graphics module 18. As shown, a client is operably coupled to the host bus interface unit (HBIU) 26 which is in turn operably coupled to the graphics memory controller 28, the system memory controller 14, and may also be coupled to a system bus table 40. Logical video graphics memory 42 includes a plurality of memory blocks, each accessible by the clients of the video graphics module 18. For example, the logical video graphics memory 42 may include a frame buffer portion, a first texture map portion, a second texture map portion, video data portion and/or a graphics data portion. With respect to the clients, the logical video graphics memory 42 appears as one contiguous memory block. As illustrated in the example, the logical memory 42 has the frame buffer occupying memory locations 0 through 4 million, the first texture map occupying memory locations 4 million to 6 million, the second texture map occupying memory locations 6 million to 8 million, the video data occupying memory locations 8 million to 12 million and the graphics data occupying the remainder of the logical memory 42. As one of average skill in the art will appreciate, the logical video graphics memory may be larger or smaller, and/or store more or less video graphics data, including texture map data, and other memory structures. As one of average skill in the art will also appreciate, the actual data referred to by the logical video graphics memory 42 is stored in physical locations of real memory, such as the system memory 16, and/or the graphics memory 20.

When a client requests access to the logical video graphics memory 42, it generates a client address (CA) 44, which corresponds to an address of the logical memory 42. For example, the client address may include a block of addresses within the frame buffer wherein the client is writing to or reading from a particular portion of the frame buffer. Alternatively, the client address 44 may be referring to one or more of the texture maps and/or video data. Note that for this example, the graphics memory 20 includes sufficient memory locations to store the 4 megabytes of frame buffer, and may additionally include memory locations to store the system bus table, which will be discussed below. In this illustration, the central processing unit 12 has allocated an additional 4 megabytes of system memory 16 to the video graphics module 18 such that the first and second texture maps may be stored in the system memory 16 and accessed via the AGP bus 24. The additional memory required for this example, in particular for the video data and graphics data, have been requested by the video graphics module 18 but are accessed via the PCI bus 22. As one of average skill in the art will appreciate, the memory sizes and allocations thereof of the graphics memory 20 and the system memory 16 may vary. For example, the central processing unit 12 may not have allocated any of the system memory 16 to the video graphics module 18. As such, the video graphics module would have to access the system memory 16 only via the PCI bus 22. As yet a further alternative, the computing system of FIG. 1 may not include an AGP bus 24. As such, the video graphics module 18 would only be able to access system memory 16 via the PCI bus 22.

Upon receiving the client address 44, the host bus interface unit 26 determines whether the client is requesting access to data that is stored in the graphics memory 20 or the system memory 16. For this example, this determination is made by determining whether the client address is less than or equal to 4 million. If the client address is less than 4 million, the host bus interface unit 26, via the address unit, generates a frame buffer address 56 which is provided to the graphics memory controller 28. The graphics memory controller 28 utilizes the frame bus address 56, which may be for a single memory location or a block of memory locations, retrieves the corresponding data 58 from the graphics memory 20. The graphics memory controller 28 provides the data 58 to the host bus interface unit 26, which, in turn, provides the retrieved data 60 to the clients.

If client address is greater than 4 million (for this illustration), the host bus interface unit 26 determines that the system memory is to be addressed and also determines which bus is to be utilized to access the system memory 16. The host bus interface unit 26 determines the bus interface by interpreting the status of the bus select 30. When the bus select 30 indicates that the AGP bus is selected, the host bus interface unit 26 generates an AGP address 46, which is provided to the system memory controller 14. The system memory controller 14 generates a physical address 52 from the AGP address 46 and subsequently retrieves data 54 from the system memory 16. The retrieved data 54 is provided to the host bus interface unit 26, which in turn provides the retrieved data 54 as retrieved data 60 to the client. Note that the bus select 30 may be established in a variety of ways. For example, it may be pre-established based on the configuration and components of the computing system 10 (e.g., only use the AGP bus, only use the PCI or ISA bus, use the AGP for texture map access requests and use the PCI or ISA bus for other requests). Alternatively, the bus select 30 may be determined as the client address is received. In the illustration, if the client address is in the range of 4–8 million, the AGP bus is selected. If, however, the client address is above 8 million, the PCI or ISA bus is selected.

Continuing with the example, when the client address indicates that the system memory 16 is to be accessed, i.e., the client address is greater than 4 million, and the PCI bus is selected, or the ISA bus is selected, the host bus interface unit 26 generates a system bus table index 48 from the client address. The system bus table index 48 may be generated by subtracting an offset from the client address, where the offset corresponds to the amount of graphics memory 20, and then shifting that value by a page size shift value. As such, if a page size is 4 kilobytes, i.e., $2^{12}$ bytes per page, the page size shift value is 12. Therefore, for a client address of 7,077,888 (binary 0 1101 1000 0000 0000 0000 0000) less an offset of 4,194,304 (binary $2^{23}$ or 0 1000 0000 0000 0000 0000 0000), produces a result of 2,883,584 (binary 0 0101 1000 0000 0000 0000 0000) and shifting the resultant right by 12 yields an index of 1,408 (binary 0 0101 1000 0000).

The system bus table index 48 is utilized to retrieve a physical address 50 from the system bus table 40. The system bus table 40 may be a separate memory device, as shown, may be appended to the graphics memory 20, and/or stored within the system memory 16. Note that if the system bus table is stored within the system memory 16, the host bus interface unit 26 would provide an AGP address 46 to the system controller 14 to retrieve the corresponding physical address 50 of the system bus table 40. Similarly, if the system bus table 40 were stored in the graphics memory, the host bus interface unit 26 would generate the system bus table index 48 to retrieve the physical address 50.

The system bus table 40 includes a plurality of locations that correspond the system bus table index with a particular physical address of the system memory 16. This table look up allows the clients to store and work with smaller addresses, which are based on the logical video graphics memory as opposed to the system memory 16. In addition, by utilizing the system bus table to retrieve physical addresses 50, the video graphics module 18 may access the system memory 16 via the PCI bus or ISA bus without intervention from the central processing unit 12.

Having obtained the physical address 50, which may be a value that is combined with the shifted offset, the host bus interface unit 26 provides the retrieved physical address 50 to the system memory controller 14. The system memory controller utilizes the physical address 50 to retrieve data 54 from the system memory 16. The retrieved data is provided to the client via the host bus interface unit.

Figure 3:
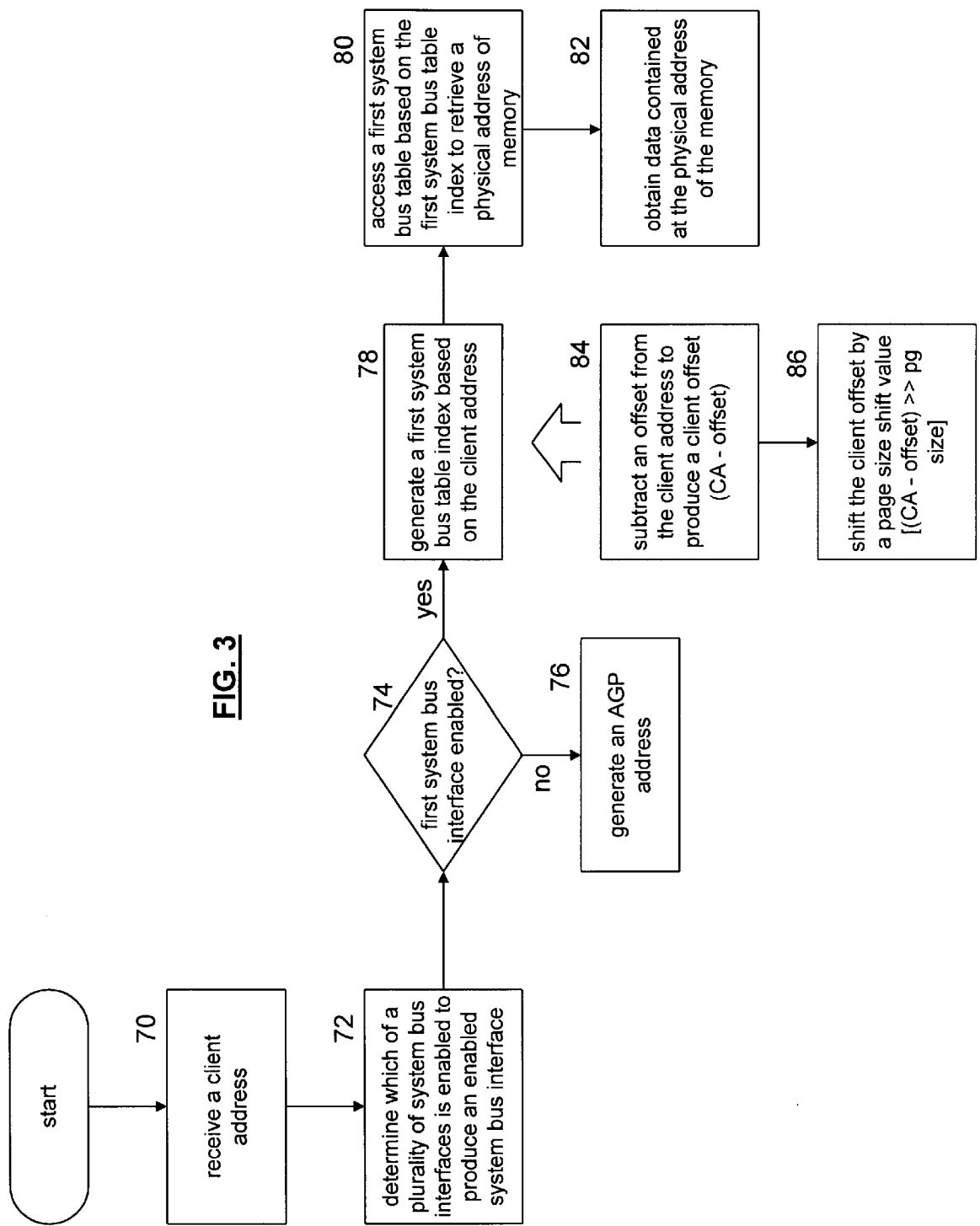
FIG. 3 illustrates a logic diagram of a method for a graphics controller to extend graphics memory in accordance with the present invention.

FIG. 3 illustrates a logic diagram of a method for a video graphics controller to extend graphics memory in accordance with the present invention. The processing steps of FIG. 3 may be implemented as operational instructions and stored in memory 34 and executed by processing module 32 of the video graphics module 18'. The processing begins at step 70 where a client address is received from one of a plurality of clients of the graphics controller, or video graphics module 18. The clients may be two-dimensional graphics engines, three-dimensional graphics engines, video capture modules, command parsing modules, etc. The process then proceeds to step 72 where a determination is made as to which of a plurality of system bus interfaces is enabled to produce an enabled system bus interface. The plurality of system bus interfaces includes a PCI bus interface, an AGP bus interface, and/or an ISA bus interface, etc.

The process then proceeds to step 74 which causes a branch function when a first system bus interface is enabled. Note that if the first system bus interface is a PCI bus interface or an ISA bus interface, the process proceeds to step 78. If the system bus interface that is enabled is an AGP bus interface, the process proceeds to step 76 where an AGP address is generated. At step 78, a first system bus table index is generated based on the client address. The generation of the client address is further described with reference to steps 84 and 86. At step 84, an offset is subtracted from the client address to produce a client offset. The process then proceeds to step 86 where the client offset is shifted by a page-size shift value thereby producing the system bus table index. In general, the index may be obtained in accordance with the following equations:

client page number=client address divided by the page size client offset=client address−(client page number * page size)

table index=client offset * number of bytes per page table entry+ page table offset translated address=page offset * page size+client offset From step 78, the process proceeds to step 80 where a first system bus table is accessed based on the first system bus table index to retrieve a physical address of memory. The process then proceeds to step 82 where data is obtained from the memory based on the physical address of the memory. As one of average skill in the art will appreciate, the video graphics module 16 may include a plurality of system bus tables thereby allowing parallel processing of accessing the physical address, or having separate tables for a PCI interface and one for an ISA interface.

The preceding discussion has presented a method and apparatus that enables a video graphics controller, or module, to extend graphics memory without, or with minimal, intervention of the central processing unit and does so without requiring multiple addressing schemes to be maintained by the video graphics controller. As such, to clients of the video graphics module, the corresponding video graphics memory appears to be a contiguous memory block regardless of whether the data is stored in graphics memory or system memory and regardless of whether the data is retrieved via the AGP bus or the PCI bus.

What is claimed is:

1. A method for a graphics controller to extend graphics memory, the method comprises the steps of:
   a) receiving a client address;
   b) determining which of a plurality of system bus interfaces is enabled to produce an enabled system bus interface;
   when the enabled system bus interface is a first system bus interface of the plurality of system bus interfaces:
   c) generating a first system bus table index based on the client address;
   d) accessing a first system bus table based on the first system bus table index to retrieve a physical address of memory; and
   e) obtaining data contained at the physical address of the memory.

2. The method of claim 1, wherein step (a) further comprises receiving the client address from one a plurality of clients of the graphics controller.

3. The method of claim 1, wherein the plurality of system bus interfaces comprises PCI bus interface, AGP bus interface, and ISA bus interface.

4. The method of claim 1, wherein the first system bus interface is PCI or ISA.

5. The method of claim 1 further comprises:
when the enabled system bus interface is an AGP bus interface, generating an AGP address from the client address.

6. The method of claim 1, wherein step (c) further comprises generating the first system bus table index by:
subtracting an offset from the client address to produce a client offset;
shifting the client offset by a page size shift value to produce the first system bus table index.

7. The method of claim 1, wherein step (e) further comprises:
providing the physical address to a system memory controller; and
receiving the data from system memory via the system memory controller.

8. A video graphics module comprises:
a plurality of video graphics clients;
video memory controller operably coupled to control reading and writing of graphical data to and from video memory; and
host bus interface operably coupled to the plurality of video graphics clients and the video memory controller, wherein the host bus interface receives a client address from one of the plurality of video graphics clients, interprets the client address to determine whether the video memory is to be addressed or non-video memory is to be addressed, generates a first system bus interface address when a first system bus interface is selected and the non-video memory is to be addressed, and generates a second system bus interface address when a second system bus interface is selected and the non-video memory is to be addressed.

9. The video graphics module of claim 8, wherein the first system bus interface is a PCI system bus interface and the second system bus interface is an AGP system bus interface.

10. The video graphics module of claim 9, wherein the host bus interface generates the first system bus interface address by:
generating a first system bus table index based on the client address;
accessing a first system bus table based on the first system bus table index to retrieve a physical address of the non-video memory; and
providing the physical address to a non-video address memory controller.

11. The video graphics module of claim 8, wherein the plurality of clients includes a command parser, a graphics engine, and a video capture engine.

12. The video graphics module of claim 8, wherein the host bus interface generates a third system bus interface address when a third system bus interface is selected and the non-video memory is to be addressed.

13. A video graphics module comprises:
a processing module; and
memory operably coupled to the processing module, wherein the memory includes operational instructions that cause the processing module to (a) receive a client address; (b) determine which of a plurality of system bus interfaces is enabled to produce an enabled system bus interface;
when the enabled system bus interface is a first system bus interface of the plurality of system bus interfaces:
(c) generate a first system bus table index based on the client address; (d) access a first system bus table based on the first system bus table index to retrieve a physical address of memory; and (e) obtain data contained at the physical address of the memory.

14. The video graphics module of claim 13, wherein the memory further comprises operational instructions that cause the processing module to receive the client address from one a plurality of clients of the graphics controller.

15. The video graphics module of claim 13, wherein the memory further comprises operational instructions that cause the processing module to generate an AGP address from the client address when the enabled system bus interface is an AGP bus interface.

16. The video graphics module of claim 13, wherein the memory further comprises operational instructions that cause the processing module to generate the first system bus table index by:
subtracting an offset from the client address to produce a client offset;
shifting the client offset by a page size shift value to produce the first system bus table index.

17. The video graphics module of claim 13, wherein the memory further comprises operational instructions that cause the processing module to obtain the data by:
providing the physical address to a system memory controller; and
receiving the data from system memory via the system memory controller.

18. A computing system comprises:
a central processing unit;
system memory;
system memory controller operably coupled to the central processing unit and the system memory, wherein the central processing unit provides system memory address instructions to the system memory controller; and
video graphics module operably coupled to the system memory controller, wherein the video graphics module includes:
a processing module; and
memory operably coupled to the processing module, wherein the memory includes operational instructions that cause the processing module to (a) receive a client address; (b) determine which of a plurality of system bus interfaces is enabled to produce an enabled system bus interface;
when the enabled system bus interface is a first system bus interface of the plurality of system bus interfaces:
(c) generate a first system bus table index based on the client address; (d) access a first system bus table based on the first system bus table index to retrieve a physical address of memory; and (e) obtain data contained at the physical address of the memory.

19. The computer system of claim 18, wherein the memory further comprises operational instructions that cause the processing module to receive the client address from one a plurality of clients of the graphics controller.

20. The computer system of claim 18, wherein the memory further comprises operational instructions that cause the processing module to generate an AGP address from the client address when the enabled system bus interface is an AGP bus interface.

21. The computer system of claim 18, wherein the memory further comprises operational instructions that cause the processing module to generate the first system bus table index by:

subtracting an offset from the client address to produce a client offset;

shifting the client offset by a page size shift value to produce the first system bus table index.

22. The computer system of claim 18, wherein the memory further comprises operational instructions that cause the processing module to obtain the data by:

providing the physical address to a system memory controller; and receiving the data from system memory via the system memory controller.

* * * * *